S. H. GALLMEIER.
CAMERA.
APPLICATION FILED OCT. 22, 1917.

1,313,285.

Patented Aug. 19, 1919.

Inventor
Sigmund H. Gallmeier
By Frank Keifer
Attorney

Witness
Eric Schinger.

UNITED STATES PATENT OFFICE.

SIGMUND H. GALLMEIER, OF ROCHESTER, NEW YORK.

CAMERA.

1,313,285.  Specification of Letters Patent.  Patented Aug. 19, 1919.

Application filed October 22, 1917. Serial No. 197,978.

*To all whom it may concern:*

Be it known that I, SIGMUND H. GALLMEIER, a subject of the Emperor of Germany, residing at Rochester, in the county of Monroe and State of New York, have invented certain new and useful Improvements in Cameras, of which the following is a specification.

The object of this invention is to provide a new and improved form of focusing film camera. This and other objects of the invention will be illustrated in the drawings, described in the specification and pointed out in the claims at the end thereof.

Figure 1:
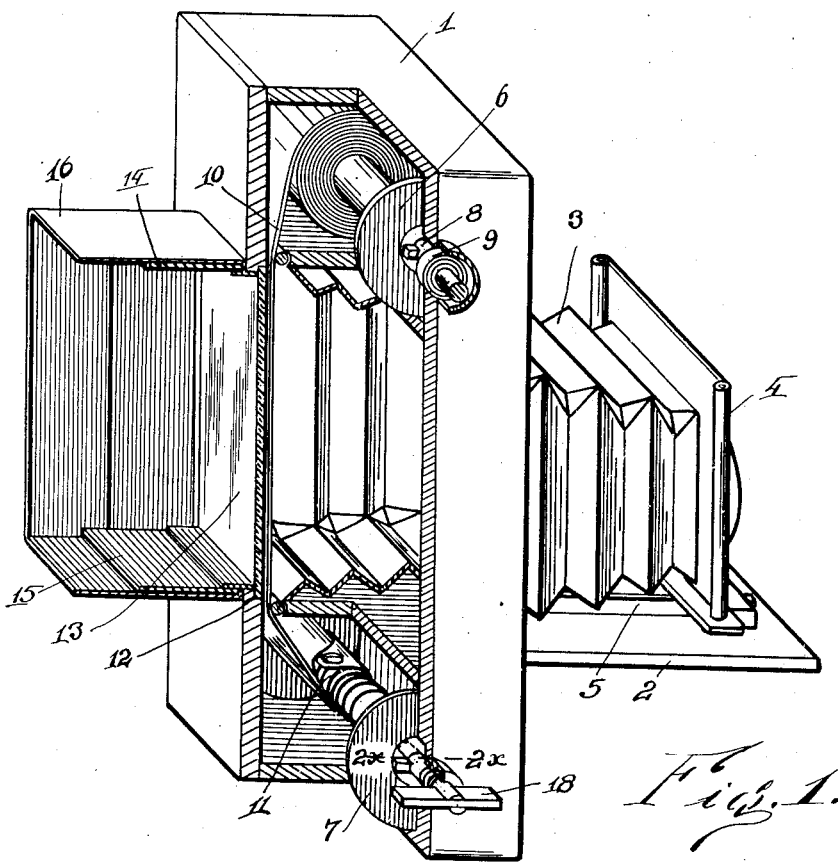
Figure 1 represents a perspective view of a camera embodying my invention, part of the camera being broken away.
Figure 2:
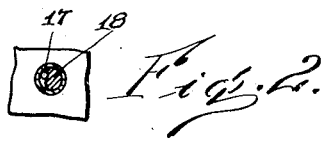
Fig. 2 is a sectional view through the winding key showing the roller friction brake which prevents the winding spool from turning in the reverse direction, the section being taken on the line 2×—2× of Fig. 1.

In the drawings, like numeral references indicate like parts. In the drawings, 1 indicates the body of the camera, having a bed plate 2 pivotally mounted in the front thereof. In the camera are provided a bellows 3 and a lens front 4 mounted to move on a track or runway 5, all of which are of the ordinary type and constitute no part of my invention.

Mounted to rotate in the ends of the body of the camera are two spools 6 and 7. The spool 6 is inserted with a fresh film and is mounted to rotate on the stud 8, on which stud is provided the coil spring 9, which is wound up by the stud as it is rotated when the film is drawn forward to the spool 7 after successive exposures. This spring when permitted to uncoil will rotate the spool 6 in the reverse direction and will cause the film to be rewound on the spool 6 as often as may be desired in the manipulation of the camera.

A wire 11 is provided which is normally fastened to and wound on the spool 7. This wire is connected to the film 10 after the spool 6 has been loaded into the camera and by means thereof the film and its paper covering are drawn forward to the spool 7 and wound thereon.

Immediately back of the rear end of the bellows is provided the opening 12 in the back of the camera, which opening is preferably closed with any transparent medium such as celluloid, having a red or yellow color that will protect the film against actinic rays. This red celluloid will have a frosted surface so that the picture can be focused thereon in the ordinary way. During the focusing operation the film and its paper covering will be drawn back on the spool 6, uncovering the opening 12 so that the light which passes through the lens front will fall without interference on the red celluloid back 13, which back and the picture thereon can be inspected by the operator from behind the camera who can move the lens front to secure the correct focus. To draw the film and its paper out of the road the spring 9 is utilized. As the film is wound forward on the spool 7, the spring 9 is wound up, and it always has the tendency to turn the spool 6 in the reverse direction and rewind the film thereon. It is prevented from doing this by a roller friction brake fastened to the winding key 18 which is provided to operate on the spool 7. When the key is pulled out of engagement with the spool 7, the spring will operate to turn the spool 6 in the reverse direction, and wind the film 10 back thereon and draw it off the spool 7. In this manner, the film can be entirely rewound on the spool 6 after every exposure and a new adjustment of the lens front can be made to put it in focus, after which the film can be wound forward on the spool 7 for a fresh exposure, the film being wound farther for each new exposure than for the preceding one.

On two opposite sides of the rectangular opening 12, I provide the doors 14 and 15 which normally close or partially close the opening 12, and which are turned in the position shown in Fig. 1 to uncover the back of the focusing screen 13. Surrounding these doors is a focusing hood 16, which can be folded down into the back of the camera over the doors 14 and 15, or which can be extended as shown in Fig. 1 for the purpose of excluding the light rays from the focusing screen 13 and forming a hood around it.

With the focusing hood 16 and the doors 14 and 15 in the position shown in Fig. 1, the image can be observed on the focusing screen and the lens of the camera can easily be put in focus, after which the film can be drawn forward to its proper position, and the exposure can be made.

Thereafter the film can be drawn back away from the focusing screen, permitting the camera to be focused again, after which the film can again be drawn forward and the exposure made.

The spool 7 is rotated by means of the winding key 18 the stud of which is provided with a cam slot which is cut into the periphery thereof. A roller 17 is inserted into this cam slot, and operates to prevent the winding key from turning in the reverse direction, so that the spool 7 cannot turn backward until the key 18 is disengaged therefrom.

I claim:

1. A camera having a supply roller and a draft roller mounted therein, a focusing screen between said rollers, means for winding a film from said supply roller to said draft roller across said focusing screen, a spring connected to said supply roller to automatically rewind the film from said draft roller back to said supply roller.

2. A camera having a supply roller and a draft roller mounted therein, a focusing screen between said rollers, means for winding a film from said supply roller to said draft roller across said focusing screen, a spring connected to said supply roller to automatically rewind the film from said draft roller back to said supply roller, while maintaining engagement therewith and allowing it to be drawn forward again for successive exposures, said means being capable of extending past said focusing screen without intercepting the image therefrom.

3. A supply roller having a film wound thereon, a draft roller to which said film can be drawn, a focusing screen between said rollers, means for connecting the film while on the supply roller with said draft roller, said means being attached to the end of said film and extending across the screen without intercepting the image thereon.

4. A camera having a supply roller and a draft roller mounted therein, a focusing screen between said rollers, means on said draft roller for moving a film from said supply roller to said draft roller across said focusing screen, said means being adapted to allow the film to be moved back in the reverse direction past said focusing screen to said supply roller, and a coil spring attached to said supply roller, said coil spring being adapted to rewind said film on said supply roller.

In testimony whereof I affix my signature.

SIGMUND H. GALLMEIER.